US012382283B2

United States Patent
Suzuki et al.

(10) Patent No.: US 12,382,283 B2
(45) Date of Patent: Aug. 5, 2025

(54) CORE NETWORK DEVICE, COMMUNICATION TERMINAL, COMMUNICATION SYSTEM, AUTHENTICATION METHOD, AND COMMUNICATION METHOD

(71) Applicant: NEC Corporation, Tokyo (JP)

(72) Inventors: Naoaki Suzuki, Tokyo (JP); Toshiyuki Tamura, Tokyo (JP); Anand Raghawa Prasad, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/280,247

(22) PCT Filed: Sep. 25, 2019

(86) PCT No.: PCT/JP2019/037495
§ 371 (c)(1),
(2) Date: Mar. 26, 2021

(87) PCT Pub. No.: WO2020/067112
PCT Pub. Date: Apr. 2, 2020

(65) Prior Publication Data
US 2022/0046416 A1    Feb. 10, 2022

(30) Foreign Application Priority Data
Sep. 28, 2018    (JP) .................................. 2018-185420

(51) Int. Cl.
*H04W 12/06* (2021.01)
*H04W 12/08* (2021.01)
(Continued)

(52) U.S. Cl.
CPC ........... *H04W 12/06* (2013.01); *H04W 12/08* (2013.01); *H04W 60/00* (2013.01); *H04W 84/042* (2013.01)

(58) Field of Classification Search
CPC ..... H04W 48/18; H04W 12/08; H04W 60/00; H04W 12/06; H04W 88/06; H04W 84/042
See application file for complete search history.

(56) References Cited

U.S. PATENT DOCUMENTS 11,223,947 B2 *  1/2022  Casati ..................... H04W 8/20
11,363,524 B2 *  6/2022  Garcia Azorero .... H04W 12/06
(Continued)

FOREIGN PATENT DOCUMENTS

CN        108401275 A      8/2018
WO     2017/170690 A1    10/2017
(Continued)

OTHER PUBLICATIONS

International Search Report for PCT Application No. PCT/JP2019/037495, mailed on Jan. 7, 2020.
(Continued)

*Primary Examiner* — Khawar Iqbal
(74) *Attorney, Agent, or Firm* — Sughrue Mion, PLLC

(57) ABSTRACT

An object is to provide a core network device being able to efficiently perform secondary authentication to be performed for each network slice. A core network device (10) according to the present disclosure includes an authentication unit (11) configured to perform, during registration processing of registering a communication terminal in a core network, first authentication processing of determining whether the communication terminal is a communication terminal permitted to be registered in the core network, a communication unit (13) configured to receive permission list information indicating at least one network slice usable by the communication terminal in a serving network, and an authentication unit (12) configured to perform, during registration processing of registering the communication terminal in the core network, second authentication processing (Continued)

of determining whether the communication terminal is a communication terminal permitted to use a network slice included in the permission list information.

14 Claims, 10 Drawing Sheets

(51) Int. Cl.
*H04W 60/00* (2009.01)
*H04W 84/04* (2009.01)

(56) References Cited

U.S. PATENT DOCUMENTS

| | | | | |
|---|---|---|---|---|
| 11,539,699 | B2* | 12/2022 | Kunz | H04W 12/72 |
| 11,930,397 | B2* | 3/2024 | Park | H04W 76/15 |
| 2017/0367036 | A1* | 12/2017 | Chen | H04L 41/12 |
| 2019/0053146 | A1 | 2/2019 | Shimojou et al. | |
| 2019/0230510 | A1* | 7/2019 | Ben Henda | H04L 63/16 |
| 2019/0246270 | A1 | 8/2019 | Ito et al. | |
| 2020/0045753 | A1* | 2/2020 | Dao | H04W 4/08 |
| 2020/0053083 | A1* | 2/2020 | Kunz | H04L 69/329 |
| 2020/0100173 | A1 | 3/2020 | Casati | |
| 2020/0275302 | A1 | 8/2020 | Youn et al. | |
| 2022/0078870 | A1* | 3/2022 | Park | H04W 8/08 |
| 2022/0095106 | A1* | 3/2022 | Tang | H04W 60/00 |
| 2022/0124870 | A1* | 4/2022 | Bharatia | H04W 76/11 |
| 2022/0166628 | A1* | 5/2022 | Lee | H04W 12/084 |
| 2022/0279434 | A1* | 9/2022 | Garcia Azorero | H04W 4/18 |
| 2023/0139780 | A1* | 5/2023 | Kunz | H04W 12/35 726/7 |
| 2023/0224700 | A1* | 7/2023 | Torvinen | H04L 63/123 370/329 |
| 2023/0232482 | A1* | 7/2023 | Suresh Babu | H04L 41/0816 370/328 |
| 2023/0354447 | A1* | 11/2023 | Talebi | H04W 76/12 |

FOREIGN PATENT DOCUMENTS

| | | |
|---|---|---|
| WO | 2018/012611 A1 | 1/2018 |
| WO | 2018/070689 A1 | 4/2018 |
| WO | 2018/171863 A1 | 9/2018 |

OTHER PUBLICATIONS

3GPP TS 23.740 V0.5.0 (Aug. 2018), 3rd Generation Partnership Project, Technical Specification Group Services and System Aspects, "Study on Enhancement of Network Slicing" (Release 16), pp. 1-53.
Nokia et al., "Slice Specific Authentication and Authorization using non 3GPP credentials—Solution", 3GPP TSG SA WG2 Meeting #128, S2-186613, Jul. 2-6, 2018, Vilnius, Lithuania, pp. 1-5.
CN Office Action for Chinese Patent Application No. 201980063728.X, mailed on Jan. 5, 2024 with English Translation.

* cited by examiner

CORE NETWORK DEVICE, COMMUNICATION TERMINAL, COMMUNICATION SYSTEM, AUTHENTICATION METHOD, AND COMMUNICATION METHOD

This application is a National Stage Entry of PCT/JP2019/037495 filed on Sep. 25, 2019, which claims priority from Japanese Patent Application 2018-185420 filed on Sep. 28, 2018, the contents of all of which are incorporated herein by reference, in their entirety.

TECHNICAL FIELD

The present disclosure relates to a core network device, a communication terminal, a communication system, an authentication method, and a communication method.

BACKGROUND ART

In a 5 Generation (5G) network, providing a service by using a network slice has been discussed. The network slice is at least one logical network defined on a physical network. A certain network slice may be, for example, a network slice that provides a public safety service. Further, another network slice may be a network slice that guarantees extremely short delay time, and may be a network slice that houses many Internet of Things (IoT) terminals at the same time.

Further, in the 5G network, it is also assumed that a communication carrier leases a network slice to a third party having an original subscriber database. In this case, in addition to authentication of a communication terminal that accesses a public land mobile network (PLMN), performing authentication of a communication terminal that accesses a network slice has been discussed. A communication terminal that accesses the PLMN and a communication terminal that accesses a network slice are the same communication terminal. The authentication of a communication terminal that accesses the PLMN is, for example, referred to as primary authentication. The authentication of a communication terminal that accesses a network slice is, for example, referred to as secondary authentication. The secondary authentication also includes processing of authorizing access to a network slice, and may be referred to as Slice-Specific Secondary Authentication and Authorization.

Non-patent Literature 1 describes an outline of primary authentication and secondary authentication being performed on user equipment (UE) being a communication terminal. The primary authentication is performed based on authentication information determined in 3rd Generation Partnership Project (3GPP) between the UE and a core network device such as an access management function (AMF) entity and an authentication server function (AUSF) entity. On the other hand, the secondary authentication is performed based on authentication information that is not determined in the 3GPP between the UE and an authentication authorization and accounting (AAA) server managed by a third party. The authentication information determined in the 3GPP may be, for example, authentication information used when the UE accesses the PLMN. The authentication information that is not determined in the 3GPP may be, for example, authentication information managed by the third party. Specifically, the authentication information managed by the third party may be user IDs and passwords (credentials) being managed in the AAA server.

Furthermore, Non-patent Literature 1 describes an outline of authentication processing, during PDU Session establishment, of performing authentication for accessing a network slice when a PDU session is established for the first time in a specific network slice.

CITATION LIST

Non-Patent Literature

[Non-patent Literature 1] 3GPP TS 23.740 V0.5.0 (2018-08), 6.3.1 section and 6.3.2 section

SUMMARY OF INVENTION

Technical Problem

The UE can access a plurality of network slices. For example, identification information about a plurality of network slices that may be accessed by the UE is included in subscriber information of the UE. The network slice that may be accessed by the UE may be, for example, a network slice being previously applied or signed up by a user who operates the UE.

When a plurality of network slices that may be accessed by the UE are included in the subscriber information, the secondary authentication is performed for each of the network slices during Registration processing of the UE. Thus, there is a problem that, as the number of network slices included in the subscriber information increases, time and a processing load being required for the secondary authentication increase, and time required until the UE performs communication using a network slice, and a processing load increase.

An object of the present disclosure is to provide a core network device, a communication terminal, a communication system, an authentication method, and a communication method that are able to efficiently perform secondary authentication to be performed for each network slice.

Solution to Problem

A core network device according to a first aspect of the present disclosure includes a first authentication unit configured to perform, during registration processing of registering a communication terminal in a core network, first authentication processing of determining whether the communication terminal is a communication terminal permitted to be registered in the core network, a communication unit configured to receive permission list information indicating at least one network slice usable by the communication terminal in a serving network, and a second authentication unit configured to perform, during registration processing of registering the communication terminal in the core network, second authentication processing of determining whether the communication terminal is a communication terminal permitted to use a network slice included in the permission list information.

A communication terminal according to a second aspect of the present disclosure includes a communication unit configured to transmit, during registration processing of registering a communication terminal in a core network, capability information indicating whether processing associated with second authentication processing of determining whether the communication terminal is a communication terminal permitted to use a network slice can be performed, to a core network device.

A communication system according to a third aspect of the present disclosure includes a first core network device configured to perform, during registration processing of registering a communication terminal in a core network, first authentication processing of determining whether the communication terminal is a communication terminal permitted to be registered in the core network, perform, during registration processing of registering the communication terminal in the core network, second authentication processing of determining whether the communication terminal is a communication terminal permitted to use a network slice, and transmit information indicating a network slice on which the second authentication processing is performed, and a second core network device configured to receive information indicating a network slice on which the second authentication processing is performed, determine whether the second authentication processing related to the communication terminal is performed when the communication terminal uses the network slice for a first time after the registration processing is completed, perform the second authentication processing when the second authentication processing is not performed, and not perform the second authentication processing when the second authentication processing is already performed.

An authentication method according to a fourth aspect of the present disclosure includes performing, during registration processing of registering a communication terminal in a core network, first authentication processing of determining whether the communication terminal is a communication terminal permitted to be registered in the core network, receiving permission list information indicating at least one network slice usable by the communication terminal in a serving network, and performing, during registration processing of registering the communication terminal in the core network, second authentication processing of determining whether the communication terminal is a communication terminal permitted to use a network slice included in the permission list information.

A communication method according to a fifth aspect of the present disclosure includes generating, during registration processing of registering a communication terminal in a core network, capability information indicating whether processing associated with second authentication processing of determining whether the communication terminal is a communication terminal permitted to use a network slice can be performed, and transmitting the capability information to a core network device.

Advantageous Effects of Invention

The present disclosure is able to provide a core network device, a communication terminal, a communication system, an authentication method, and a communication method that are able to efficiently perform secondary authentication to be performed for each network slice.

DESCRIPTION OF EMBODIMENTS

First Example Embodiment

Figure 1:
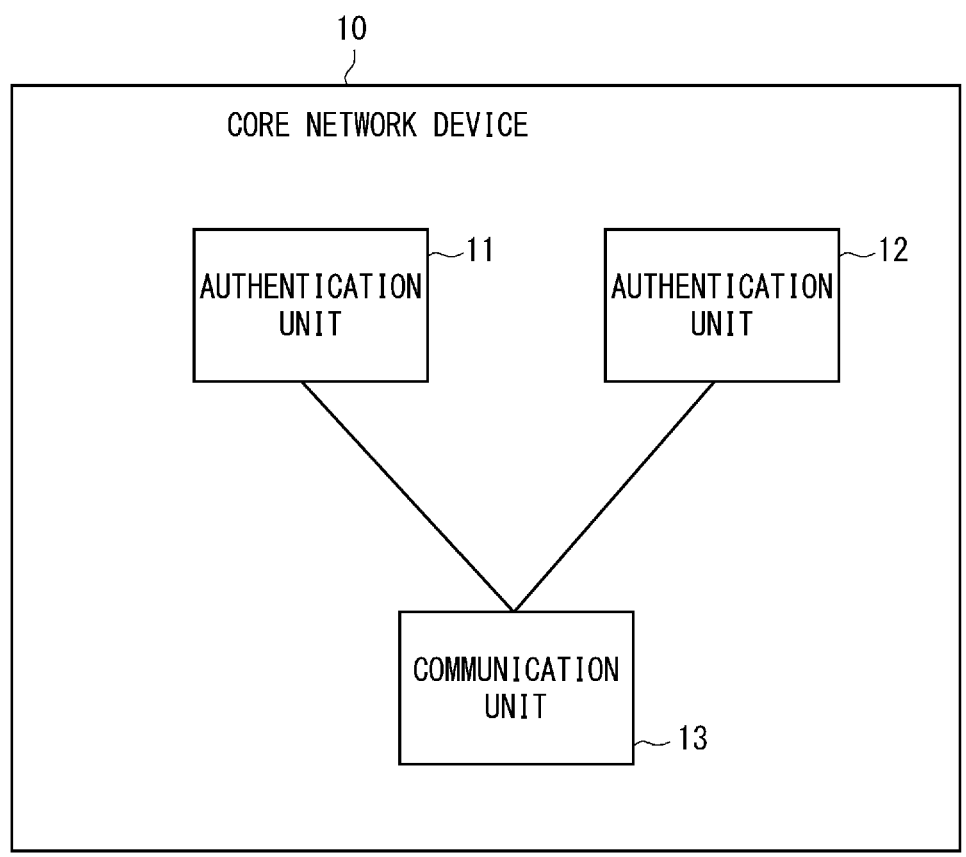
FIG. 1 is a configuration diagram of a core network device according to a first example embodiment.

Embodiments of the present disclosure will be described below with reference to the drawings. A configuration example of a core network device 10 according to a first example embodiment will be described by using FIG. 1. The core network device 10 may be a computer device that operates by a processor executing a program stored in a memory.

The core network device 10 includes an authentication unit 11, an authentication unit 12, and a communication unit 13. The authentication unit 11, the authentication unit 12, and the communication unit 13 may be software or a module whose processing is performed by a processor executing a program stored in a memory. Alternatively, the authentication unit 11, the authentication unit 12, and the communication unit 13 may be hardware such as a circuit or a chip.

The authentication unit 11 performs, during registration processing of registering a communication terminal in a core network, authentication processing of determining whether the communication terminal is a communication terminal permitted to be registered in the core network. Authentication of a communication terminal performed by the authentication unit 11 corresponds to primary authentication. The communication terminal may be, for example, a cellular phone terminal, a smartphone terminal, or a tablet type terminal. Alternatively, the communication terminal may be an Internet of Things (IoT) terminal or a machine type communication (MTC) terminal. Alternatively, the communication terminal may be UE used to be a general name for a communication terminal in 3GPP.

The core network is a network included in a 5G network. The 5G network includes an access network being directly accessed by a communication terminal, and a core network that put together a plurality of access networks.

For example, the registration processing may be performed after the communication terminal shifts from a power OFF state to a power ON state. Alternatively, the registration processing may be performed after a lapse of a predetermined period since the registration processing is performed last time. The registration processing may be, for example, Registration processing whose operation is determined in the 3GPP. The communication terminal is registered in the core network, and thus the core network performs movement management, session management, and the like of the communication terminal.

The communication unit 13 receives permission list information indicating at least one network slice usable by the communication terminal in a serving network. The serving network is a network that provides a communication service to an area in which the communication terminal is present.

The serving network may be a home public land mobile network (HPLMN) that manages subscriber information of the communication terminal, and may be a Visited PLMN (VPLMN) serving as a roaming destination.

All network slices that may be accessed by the communication terminal are included in the subscriber information of the communication terminal. The network slice that can be provided to the communication terminal varies for each serving network. Thus, the communication terminal may not be able to use all the network slices included in the subscriber information in a currently connected serving network. A network slice included in the permission list information is a network slice usable in the serving network among network slices included in the subscriber information of the communication terminal. Thus, a network slice included in the permission list information may be a part of all network slices included in the subscriber information.

The communication unit 13 may receive the permission list information from another core network device disposed in the HPLMN, or may receive the permission list information from another core network device disposed in the VPLMN.

The authentication unit 12 performs, during registration processing of registering the communication terminal in the core network, authentication processing of determining whether the communication terminal is a communication terminal permitted to use a network slice included in the permission list information. Authentication performed by the authentication unit 12 corresponds to secondary authentication. When a plurality of network slices are included in the permission list information, the authentication unit 12 may cooperate with each third party that manages each of the network slices, and perform the authentication processing of the communication terminal.

As described above, the authentication unit 12 of the core network device 10 performs the authentication unit for the same number of times as the number of network slices included in the permission list information. Herein, the number of network slices included in the permission list information is smaller than that of network slices included in the subscriber information. Thus, time required for the authentication processing performed by the authentication unit 12 during the registration processing of registering the communication terminal in the core network is shortened further than that when the authentication processing is performed for the same number of times as the number of network slices included in the subscriber information.

Further, the core network device 10 performs an authentication method indicated next. First, the core network device 10 performs first authentication processing of determining whether a communication terminal is a communication terminal permitted to be registered in a core network during registration processing of registering the communication terminal in the core network. Next, the core network device 10 receives permission list information indicating at least one network slice usable by the communication terminal in a serving network. Next, the core network device 10 performs second authentication processing of determining whether the communication terminal is a communication terminal permitted to use a network slice included in the permission list information during the registration processing of registering the communication terminal in the core network.

Second Example Embodiment

Figure 2:
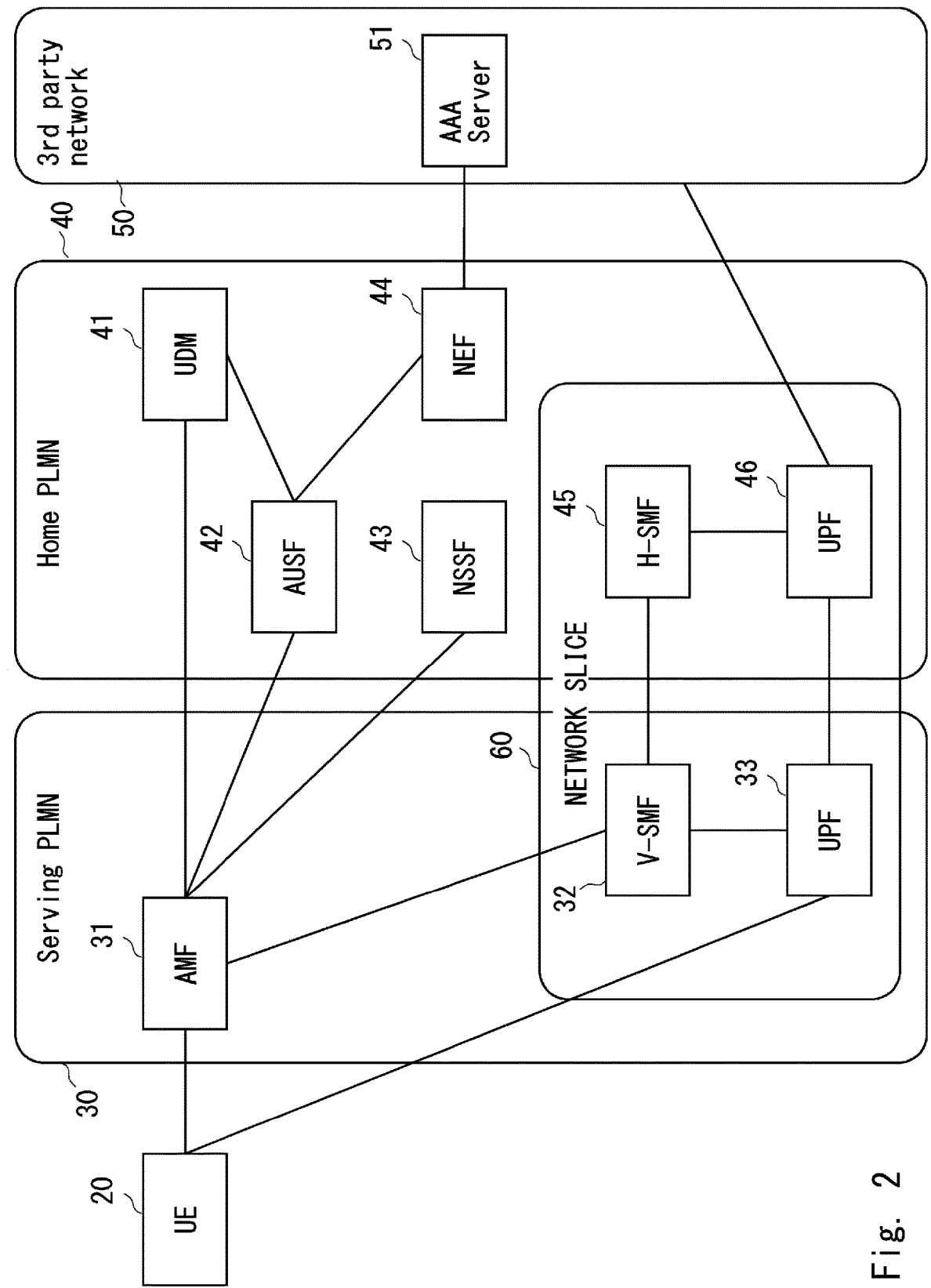
FIG. 2 is a configuration diagram of a communication system according to a second example embodiment.

Then, a configuration example of a communication system according to a second example embodiment will be described by using FIG. 2. The communication system in FIG. 2 includes UE 20, a Serving PLMN 30, an HPLMN 40, and a 3rd party network 50. The UE 20 is assumed to be present in an area in which the Serving PLMN 30 provides a communication service. The UE 20 corresponds to a communication terminal. The Serving PLMN 30 corresponds to a serving network. In FIG. 2, the Serving PLMN 30 may be referred to as a VPLMN. The 3rd party network 50 may be a network managed by a communication carrier different from a communication carrier who manages the Serving PLMN 30 and a communication carrier who manages the HPLMN 40. The 3rd party network 50 may be, for example, a network managed by a carrier who provides an application service.

The Serving PLMN 30 includes an access management function (AMF) entity 31 (hereinafter referred to as an AMF 31), a visited session management function (V-SMF) entity 32 (hereinafter referred to as a V-SMF 32), and a user plane function (UPF) entity 33 (hereinafter referred to as a UPF 33). The AMF 31 corresponds to the core network device 10 in FIG. 1.

The HPLMN 40 includes a unified data management (UDM) entity 41 (hereinafter referred to as a UDM 41), an authentication server function (AUSF) entity 42 (hereinafter referred to as an AUSF 42), a network slice selection function (NSSF) entity 43 (hereinafter referred to as an NSSF 43), a network exposure function (NEF) entity 44 (hereinafter referred to as an NEF 44), an H-SMF entity 45 (hereinafter referred to as an H-SMF 45), and a UPF entity 46 (hereinafter referred to as a UPF 46).

The 3rd party network 50 includes an authentication, authorization and accounting (AAA) Server 51.

The AMF 31 manages access, mobility, and the like related to the UE 20. Furthermore, the AMF 31 cooperates with the AUSF 42, the UDM 41, and the like, and performs primary authentication processing related to the UE 20. The V-SMF 32 performs session management related to the UE 20. The session management includes establishment, a change, and deletion of a session. The UPF 33 performs routing or a transfer of user plane data between the UE 20 and the UPF 46.

The UDM 41 manages subscriber information related to the UE 20. Identification information about a plurality of network slices that may be accessed by the UE 20 is included in the subscriber information. The network slice that may be accessed by the UE 20 may be, for example, a network slice being previously applied or signed up by a user who operates the UE 20.

The AUSF 42 manages authentication information related to the UE 20. The authentication information may be, for example, a security key, an authentication algorithm, and the like related to the UE 20. The NSSF 43 transmits, to the AMF 31, identification information about a network slice usable by the UE 20 in the Serving PLMN 30. The identification information about a network slice may be, for example, network slice selection assistance information (NSSAI). Further, the AUSF 42 relays data transmitted between the AAA Server 51 disposed in the 3rd party network 50 and a node device disposed in the HPLMN 40.

The NEF 44 relays data transmitted between the AAA Server 51 disposed in the 3rd party network 50 and the node device disposed in the HPLMN 40. The H-SMF 45 performs, together with the V-SMF 32, session management related to the UE 20. The UPF 46 performs routing or a transfer of user plane data between the UPF 33 and the 3rd party network 50. For example, the UPF 46 may perform routing of user plane data between an application server (not illustrated) disposed in the 3rd party network 50 and the UPF 33.

The V-SMF 32, the UPF 33, the H-SMF 45, and the UPF 46 constitute a network slice 60. Each of the V-SMF 32, the UPF 33, the H-SMF 45, and the UPF 46 may be used for only the network slice 60 and may be shared with another network slice. The network slice 60 is a network slice managed by the 3rd party network 50. In other words, when the UE 20 uses a service provided by the 3rd party network 50, the UE 20 is connected to the network slice 60.

The AAA Server 51 performs secondary authentication processing related to the UE 20 that uses the network slice 60.

In the configuration example in FIG. 2, the AUSF 42 and the NEF 44 are configured to relay data transmitted between the AMF 31 and the AAA Server 51, but another independent node device (not illustrated) different from the AUSF 42 and the NEF 44 may be configured to relay data. Further, the communication system may not include the NEF 44, and the AUSF 42 may be configured to relay data transmitted between the AMF 31 and the AAA Server 51. The node device that relays data transmitted between the AMF 31 and the AAA Server 51 may be an AAA proxy function (AAA-F).

Then, a flow of processing of Registration related to the UE 20 will be described by using FIG. 3. First, the UE 20 transmits a Registration Request message to the AMF 31 (S11). The Registration Request includes Requested NSSAI. The Requested NSSAI is NSSAI provided from the UE 20 to the Serving PLMN 30. In other words, the Requested NSSAI is NSSAI indicating a network slice that the UE 20 is desired to use or connect in the Serving PLMN 30. Single network slice selection assistance information (S-NSSAI) is identification information indicating one network slice, and a plurality of S-NSSAIs may be included in the NSSAI.

Note that the AMF 31 may acquire the Requested NSSAI from a message other than the Registration Request message (S11). For example, in step S12, the AMF 31 transmits an NAS Security Mode Command message to the UE 20, and the UE 20 returns, to the AMF 31, an NAS Security Mode Complete message as a response to the NAS Security Mode Command message. In this case, the UE 20 may set Requested NSSAI in the NAS Security Mode Complete message, and the AMF 31 may acquire the Requested NSSAI. Further, for example, before step S12, the AMF 31 may transmit an Identity Request message to the UE 20, and the UE 20 may return, to the AMF 31, an Identity Response message as a response to the Identity Request message. In this case, the UE 20 may set Requested NSSAI in the Identity Response message, and the AMF 31 may acquire the Requested NSSAI.

Further, the AMF 31 may receive a message including Requested NSSAI from any node device other than the UE 20, and may acquire the Requested NSSAI. For example, any node device may receive a message including Requested NSSAI being transmitted from the UE 20. In this case, the AMF 31 may acquire the Requested NSSAI by receiving the message including the Requested NSSAI from the any node device.

Next, in the UE 20, the AMF 31, and the AUS 42, a security procedure for accessing an existing PLMN is performed (S12). The existing PLMN is, for example, the Serving PLMN 30 and the HPLMN 40. Specifically, in step S12, primary authentication processing related to the UE 20 is performed. For example, the AMF 31 performs the primary authentication processing related to the UE 20 by using authentication information received from the AUSF 42. The authentication information received by the AMF 31 from the AUSF 42 may also be referred to as 3GPP credentials, for example. In other words, the authentication information received by the AMF 31 from the AUSF 42 may be authentication information determined in the 3GPP. For example, the 3GPP credentials may include a subscription permanent identifier (SUPI) being a user ID of the UE 20, and authentication information used when the UE 20 accesses the Serving PLMN 30.

For example, the primary authentication processing is to authenticate an SUPI in authentication and key agreement (AKA) performed between the AMF 31 and the UE 20. In other words, the AMF 31 authenticates an SUPI indicating the UE 20 in the AKA performed between the UE 20 and the AMF 31. Furthermore, the primary authentication processing may include authorization processing related to the UE 20. For example, the primary authentication processing may include authorization of use of the Serving PLMN 30 by the UE 20 by using subscriber information of the UE 20 acquired from the UDM 41. In other words, the AMF 31 may authorize the UE 20 to use the Serving PLMN 30 by using subscriber information of the UE 20 acquired from the UDM 41. The primary authentication processing may be referred to as primary authentication and primary authorization processing.

Next, the AMF 31 transmits an Nudm_SDM_Get message to the UDM 41 (S13). Next, the UDM 41 transmits an Nudm_SDM_Get response message to the AMF 31 (S14). The Nudm_SDM_Get response message includes Subscribed S (Single)-NSSAI. The S-NSSAI is identification information indicating one network slice. The Subscribed S-NSSAI is identification information indicating a network slice included in the subscriber information. A plurality of Subscribed S-NSSAIs (Subscribed S-NSSAIs) may be included in the Nudm_SDM_Get response message.

Next, the AMF 31 transmits an Nnssf_NSSelection_Get message to the NSSF 43 (S15). Next, the NSSF 43 transmits an Nnssf_NSSelection_Get response message to the AMF 31 (S16). The Nnssf_NSSelection_Get response message includes Allowed-NSSAI. The Allowed NSSAI includes identification information (S-NSSAI) about a network slice that can be used by the UE 20 in the Serving PLMN 30 among a plurality of Subscribed S-NSSAIs. A plurality of S-NSSAIs (S-NSSAIs) may be included in the Allowed NSSAI. Herein, it is assumed that the number of the S-NSSAIs included in the Allowed NSSAI is smaller than the number of the plurality of Subscribed S-NSSAIs included in the Nudm_SDM_Get response message. In other words, it is assumed that the S-NSSAI included in the Allowed NSSAI is a part of the plurality of Subscribed S-NSSAIs included in the Nudm_SDM_Get response message. For example, the NSSF 43 may acquire Subscribed S-NSSAI related to the UE 20 from the UDM 41, and manage S-NSSAI indicating a network slice that can be used by the UE 20 in the Serving PLMN 30.

Next, the AMF 31 checks whether secondary authentication processing is applied in a network slice indicated by each of the S-NSSAIs included in the Allowed NSSAI (S17). The AMF 31 may check, by using a policy server and the like, whether the secondary authentication processing is applied in each network slice included in the Allowed NSSAI. For example, among 3rd party networks, there is also a 3rd party network including a policy that does not apply the secondary authentication processing when a network slice managed by the 3rd party network is used.

The policy server may manage information related to whether each network slice requests secondary authentication related to the UE 20. Further, in a node device other than the policy server, the information related to whether the secondary authentication related to the UE 20 is requested may be managed. In this case, the AMF 31 may perform the check in step S17 by using the node device that manages the information related to whether the secondary authentication related to the UE 20 is requested.

For example, the AMF 31 may perform the check in step S17 by using the UDM 41. In this case, the AMF 31 may receive, from the Nudm_SDM_Get response message (S14), the information related to whether the secondary authentication processing is applied in a network slice indicated by the Subscribed S-NSSAI. Furthermore, the AMF 31 may perform the check in step S17 by using the received information.

Next, in the UE 20, the AMF 31, the AUSF 42, and the AAA Server 51, a security procedure for accessing the network slice 60 to which the secondary authentication processing is applied is performed (S18). Specifically, in step S18, the secondary authentication processing related to the UE 20 is performed. For example, in the secondary authentication, authentication information managed by a third party may be used. The authentication information managed by the third party may include a user ID used when the UE 20 uses the network slice 60, and a password managed in the AAA Server 51.

In the secondary authentication processing, an authentication procedure using Extensible Authentication Protocol (EAP) may be performed. For example, the AMF 31 notifies the UE 20 of the S-NSSAI, and transmits a request message for requesting transmission of a user ID and a password used in the S-NSSAI. Furthermore, the AMF 31 transmits the user ID and the password received from the UE 20 to the AAA Server 51 via the AUSF 42. The AAA Server 51 may authenticate the user ID related to the UE 20 received from the AUSF 42, i.e., the UE 20, and, furthermore, authorize the UE 20 to use the network slice 60 by using the user ID and the password being received from the UE 20. The secondary authentication processing may include authentication of the UE 20 and authorization of use of the network slice 60 by the UE 20. Alternatively, the secondary authentication processing may be referred to as secondary authentication processing and secondary authorization processing.

The secondary authentication processing is performed for each network slice in the Registration processing related to the UE 20. In other words, the secondary authentication processing is repeated in the Registration processing for the same number of times as the number of the S-NSSAIs indicating a network slice to which the secondary authentication processing is applied among the S-NSSAIs included in the Allowed NSSAI.

As described above, the number of the S-NSSAIs included in the Allowed NSSAI is smaller than the number of the Subscribed S-NSSAIs transmitted from the UDM 41. Furthermore, among network slices indicated by the S-NSSAIs included in the Allowed NSSAI, there is also a network slice to which the secondary authentication processing is not applied. Thus, the number of network slices to which the secondary authentication processing is applied is smaller than the number of network slices indicated by the S-NSSAIs included in the Allowed NSSAI. As a result, in the communication system in FIG. 2, the number of times of the secondary authentication processing performed in the Registration processing related to the UE 20 is smaller than that when the secondary authentication processing is repeated for the same number of times as the number of the Subscribed S-NSSAIs transmitted from the UDM 41. In this way, the UE 20, the AMF 31, the AUSF 42, and the AAA Server 51 can reduce time required for the secondary authentication processing in the Registration processing further than that when the secondary authentication processing is repeated for the same number of times as the number of the Subscribed S-NSSAIs. Furthermore, the UE 20, the AMF 31, the AUSF 42, and the AAA Server 51 can reduce a processing load required for the secondary authentication processing.

Further, processing of registering the UE 20 in the core network is performed for each access network. Thus, the UE 20 can transmit the Registration Request message to the AMF 31 via each access network such as 3GPP Access and Non-3GPP Access. The 3GPP Access is an access network that supports a wireless communication method determined in the 3GPP. The Non-3GPP Access is an access network that supports a wireless communication method different from the wireless communication method determined in the 3GPP.

The AMF 31 receives the Registration Request message from the UE 20 via any one of the 3GPP Access and the Non-3GPP Access, and performs the secondary authentication. For example, it is assumed that the AMF 31 receives the Registration Request message via the 3GPP Access, and performs the secondary authentication. Herein, when the AMF 31 receives the Registration Request message via the Non-3GPP Access, the secondary authentication in a network slice on which the secondary authentication related to the UE 20 is already performed may not be performed and may be omitted. In this way, the authentication for the same UE in the same network slice can be prevented from being performed in an overlapping manner. In this way, as compared to a case where the secondary authentication processing is not omitted, time required for the secondary authentication processing in the Registration processing can be reduced, and a processing load required for the secondary authentication processing can be reduced. Similarly to a case where the secondary authentication is performed based on the Registration Request message received via the Non-3GPP Access, the secondary authentication based on the Registration Request message received via the 3GPP Access may also be omitted.

Further, when the secondary authentication related to the S-NSSAI of the UE 20 fails, the AMF 31 may replace, with other S-NSSAI, the S-NSSAI provided to the UE 20 in the Allowed N-SSAI when the secondary authentication succeeds, and may provide the S-NSSAI to the UE 20. For example, the S-NSSAI after the replacement may be default S-NSSAI. Further, the S-NSSAI after the replacement may be provided with an identifier indicating that the S-NSSAI has been replaced and an identifier indicating the S-NSSAI before the replacement. The UE 20 recognizes that access to a network slice indicated by the S-NSSAI after the replacement is authorized. In this way, the AMF 31 can prevent a situation where the UE 20 cannot access any network slice. In other words, the AMF 31 can guide the UE 20 that cannot be authenticated such that the UE 20 accesses a specific network slice.

Third Example Embodiment

Figure 4:
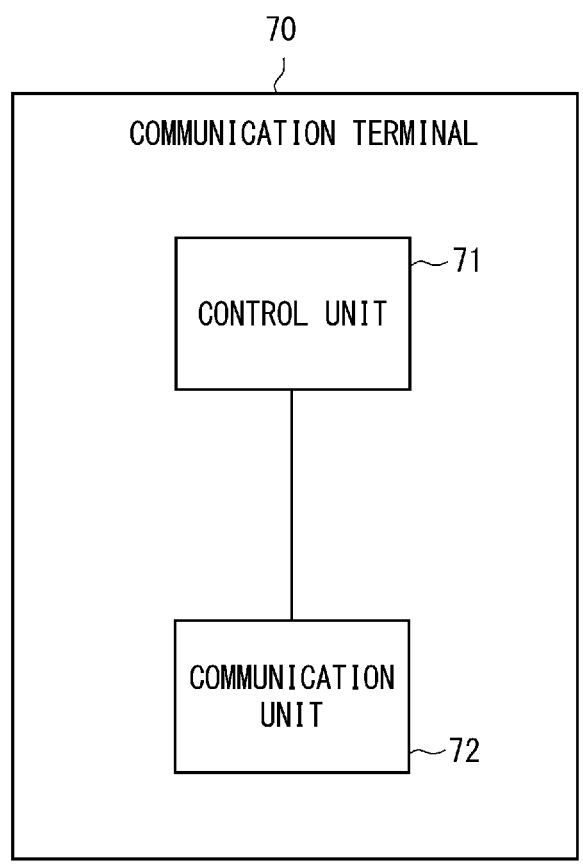
FIG. 4 is a configuration diagram of a communication terminal according to a third example embodiment.

Then, a configuration example of a communication terminal 70 according to a third example embodiment will be described by using FIG. 4. The communication terminal 70 may be a computer device that operates by a processor executing a program stored in a memory. Further, the core network device 10 described in the first example embodiment is used as a core network device that communicates with the communication terminal 70.

The communication terminal 70 includes a control unit 71 and a communication unit 72. The control unit 71 and the communication unit 72 may be software or a module whose processing is performed by a processor executing a program stored in a memory. Alternatively, the control unit 71 and the communication unit 72 may be hardware such as a circuit or a chip.

The control unit 71 generates, during registration processing of registering the communication terminal 70 in a core network, capability information indicating whether processing associated with authentication processing of determining whether the communication terminal 70 is a communication terminal permitted to use a network slice can be performed.

The authentication processing of determining whether a communication terminal is a communication terminal permitted to use a network slice corresponds to secondary authentication processing. The processing associated with the authentication processing of determining whether a communication terminal is a communication terminal permitted to use a network slice includes processing of receiving, by the communication terminal 70, a message and the like transmitted from the core network device 10 in the secondary authentication processing. Furthermore, the processing associated with the authentication processing of determining whether a communication terminal is a communication terminal permitted to use a network slice includes processing of reading a parameter and the like set for a received message. Furthermore, the processing associated with the authentication processing of determining whether a communication terminal is a communication terminal permitted to use a network slice includes processing of transmitting a message or responding to the core network device 10 in order to normally continue the secondary authentication processing.

The communication unit 72 transmits the capability information generated in the control unit 71 to the core network device 10.

The core network device 10 determines whether the capability information received from the communication terminal 70 indicates that the communication terminal 70 can perform the processing associated with the secondary authentication processing. When the core network device 10 determines that the communication terminal 70 can perform the processing associated with the secondary authentication processing, the core network device 10 performs the secondary authentication processing related to the communication terminal 70 during the registration processing of registering the communication terminal 70 in the core network. When the core network device 10 does not receive the capability information from the communication terminal 70, the core network device 10 may determine that the communication terminal 70 cannot perform the processing associated with the secondary authentication processing.

For example, when the core network device 10 performs the secondary authentication processing on a communication terminal on which the processing associated with the secondary authentication cannot be performed, the core network device 10 cannot receive information needed for the secondary authentication processing from the communication terminal. In other words, the core network device 10 wastes time related to the secondary authentication processing even though the secondary authentication will fail.

On the other hand, the communication terminal 70 according to the third example embodiment can transmit, to the core network device 10, the capability information indicating whether the processing associated with the secondary processing can be performed. Furthermore, the core network device 10 does not perform, on the communication terminal 70 determined that the processing associated with the secondary processing cannot be performed, the secondary authentication processing related to the communication terminal 70 during the registration processing of registering the communication terminal 70 in the core network, and continues the processing by considering that the secondary authentication processing succeeds or fails. In this way, time and a processing load related to the secondary authentication processing can be reduced.

For the communication terminal 70 determined that the processing associated with the secondary processing cannot be performed, the core network device 10 may determine for each network slice whether the secondary authentication processing is considered to succeed or fail. For example, certain S-NSSAI may be considered to succeed, but other S-NSSAI may be considered to fail.

Further, the communication terminal 70 performs a communication method indicated next. First, the communication terminal 70 generates, during registration processing of registering a communication terminal in a core network, capability information indicating whether processing associated with second authentication processing of determining whether the communication terminal is a communication terminal permitted to use a network slice can be performed. Next, the communication terminal 70 transmits the capability information to a core network device.

Then, a flow of processing of Registration related to UE 80 will be described by using FIG. 5. The UE 80 corresponds to the communication terminal 70. First, the UE 80 transmits a Registration Request message to an AMF 31 (S21). The Registration Request includes Requested NSSAI and UE capability. The UE capability corresponds to the capability information indicating whether the UE 80 can perform the processing associated with the secondary authentication processing. The UE capability may be represented by Security capability or another expression.

Note that the AMF 31 may acquire the Requested NSSAI and/or the UE capability from a message other than the Registration Request message (S21). For example, in step S22, when the AMF 31 transmits an NAS Security Mode Command message to the UE 80, the UE 80 returns, to the AMF 31, an NAS Security Mode Complete message as a response to the NAS Security Mode Command message. In this case, the UE 80 may set the Requested NSSAI and/or the UE capability in the NAS Security Mode Complete message, and the AMF 31 may acquire the Requested NSSAI and/or the UE capability. Further, for example, before step S22, when the AMF 31 transmits an Identity Request message to the UE 80, the UE 80 may return, to the AMF 31, an Identity Response message as a response to the Identity Request message. In this case, the UE 80 may set the Requested NSSAI and/or the UE capability in the Identity Response message, and the AMF 31 may acquire the Requested NSSAI and/or the UE capability.

Further, the AMF 31 may receive a message including the Requested NSSAI and/or the UE capability from any node device other than the UE 80, and may acquire the Requested NSSAI and/or the UE capability. For example, any node device may receive a message including the Requested NSSAI and/or the UE capability being transmitted from the UE 80. In this case, the AMF 31 may acquire the Requested NSSAI and/or the UE capability by receiving the message including the Requested NSSAI and/or the UE capability from the any node device that has received the message.

Figure 3:
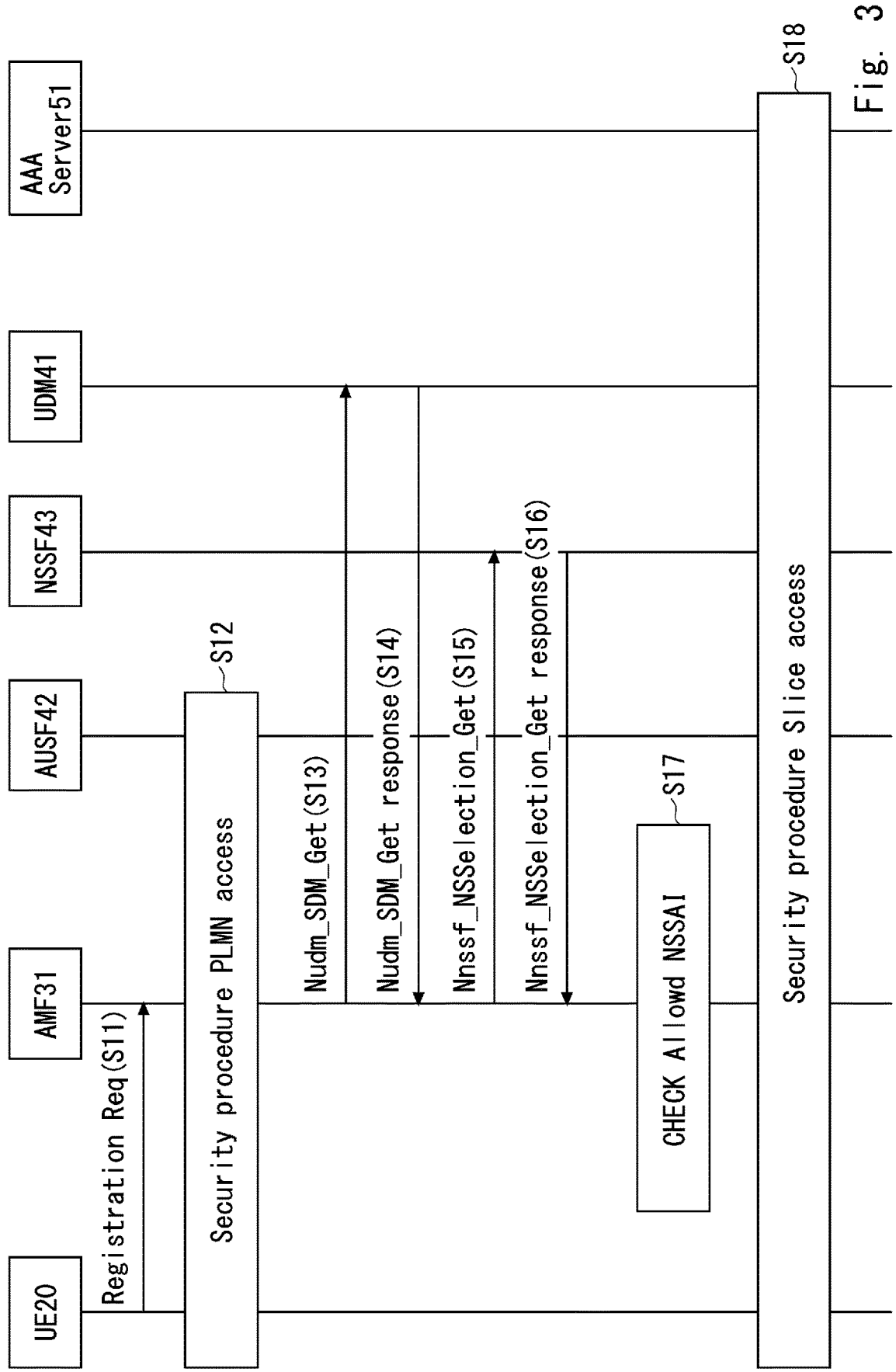
FIG. 3 is a diagram illustrating a flow of processing of Registration according to the second example embodiment.

Steps S22 to S27 are similar to steps S12 to S17 in FIG. 3, and thus detailed description thereof will be omitted.

Next, when a predetermined requirement is satisfied, the AMF 31 performs the secondary authentication in step S28, and, when the predetermined requirement is not satisfied, the AMF 31 does not perform the secondary authentication in step S28. When the predetermined requirement is satisfied, it may be indicated that the processing associated with the secondary authentication processing can be performed, and a network slice that requests connection is a network slice to which the secondary authentication is applied. When the predetermined requirement is not satisfied, it may not be indicated that the processing associated with the secondary authentication processing can be performed, or a network slice that requests connection is not a network slice to which the secondary authentication is applied.

The AMF 31 not performing the secondary authentication may indicate that an authentication procedure using an EAP is not performed. For example, the AMF 31 not performing the secondary authentication may indicate that a request message for requesting transmission of a user ID and a password used in a network slice indicated by the S-NSSAI is not transmitted from the AMF 31 to the UE 80.

Further, the AMF 31 not performing the secondary authentication may indicate that the AMF 31 returns a Registration Reject message including a specific cause code in response to the Registration Request message (S21). The specific cause code may be referred to as a specific 5GMM cause value. For example, the specific cause code may mean that the AMF 31 does not perform the secondary authentication, or may mean that the AMF 31 determines that the UE 80 cannot perform the processing associated with the secondary authentication processing.

Furthermore, when the Registration Reject message including such a specific cause code is received, the UE 80 may change the S-NSSAI included in the Requested NSSAI, and transmit the Registration Request message (S21). For example, the S-NSSAI after the change may be default S-NSSAI. Alternatively, the UE 80 may select another PLMN different from the PLMN to which the Registration Request message is transmitted, change the PLMN, and transmit the Registration Request message (S21).

Figure 5:
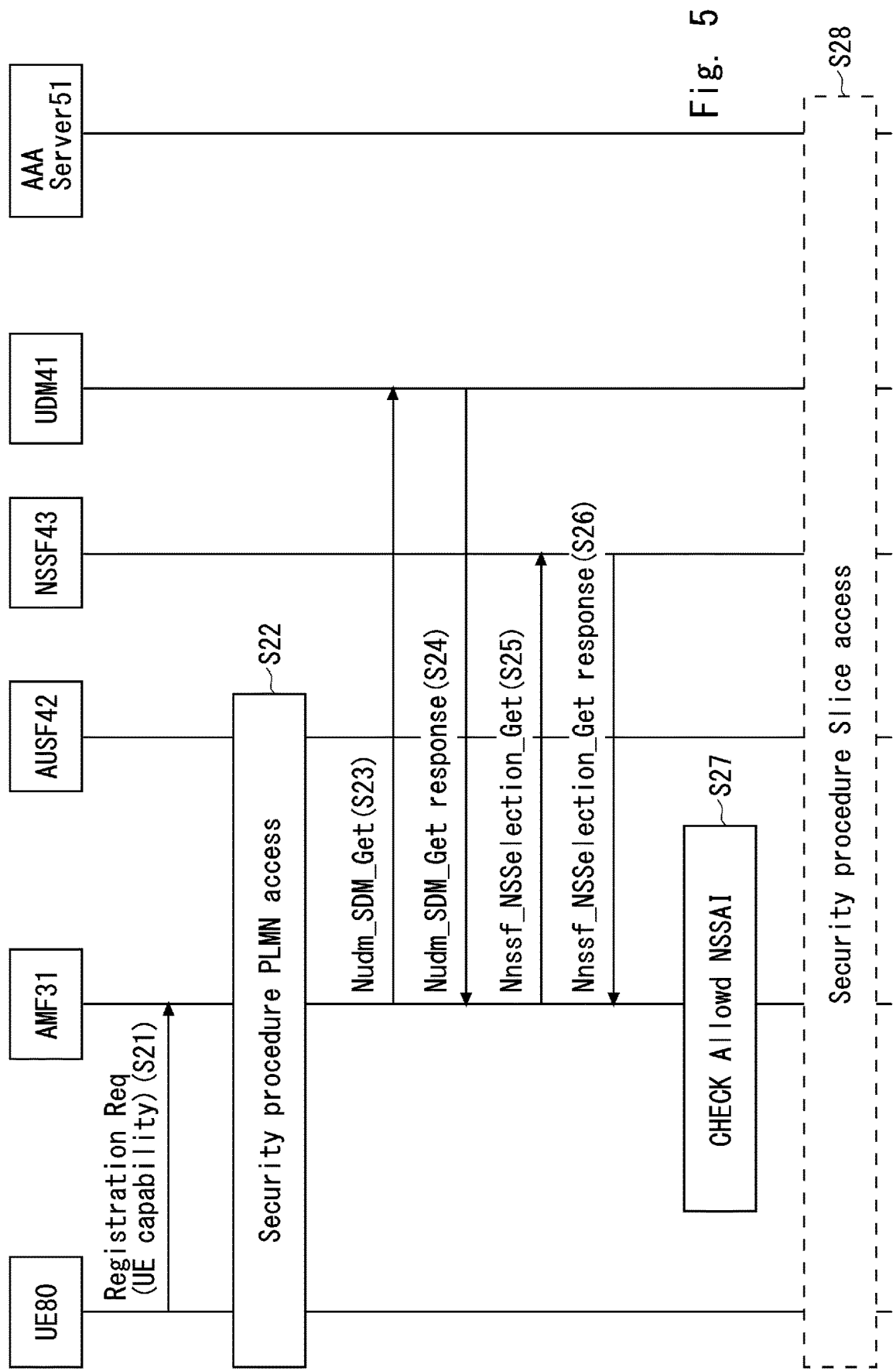
FIG. 5 is a diagram illustrating a flow of processing of Registration according to the third example embodiment.

FIG. 5 illustrates that, in step S27, the AMF 31 checks whether the secondary authentication processing is applied in a network slice indicated by each of the S-NSSAIs included in the Allowed NSSAI, which is not limited thereto. For example, the AMF 31 may check whether the secondary authentication processing is applied in a network slice indicated by each of the plurality of Subscribed S-NSSAIs received in step S24.

As described above, the UE 80 according to the third example embodiment can transmit, to the AMF 31, the UE capability indicating whether the processing associated with the secondary authentication processing can be performed. In this way, the AMF 31 performs the secondary authentication on the UE 80 only when the UE 80 can perform the processing associated with the secondary authentication processing. As a result, when the UE 80 cannot perform the processing associated with the secondary authentication, time and a processing load related to the secondary authentication processing can be reduced.

Fourth Example Embodiment

Figure 6:
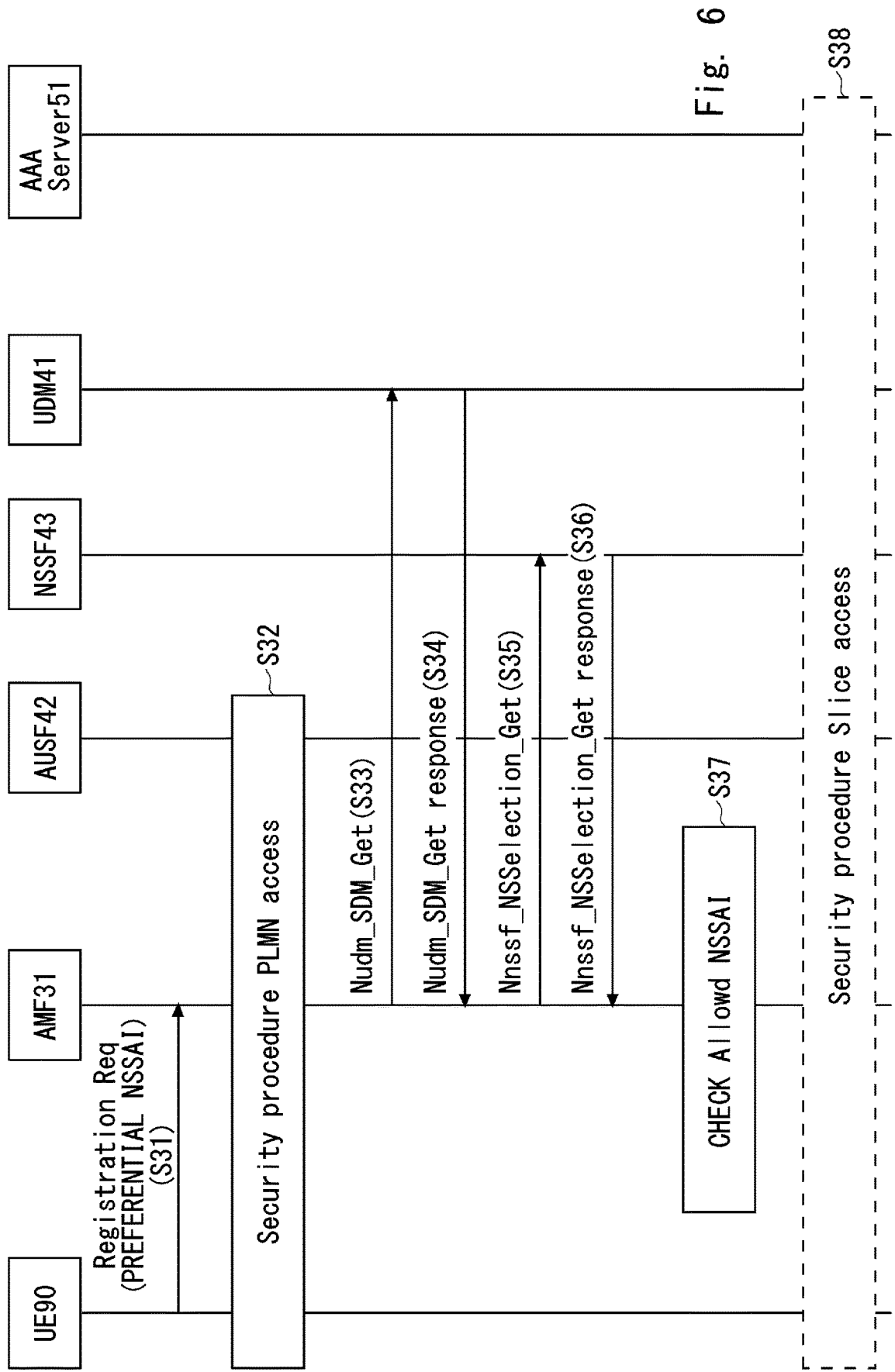
FIG. 6 is a diagram illustrating a flow of processing of Registration according to a fourth example embodiment.

Then, a flow of processing of Registration related to UE 90 will be described by using FIG. 6. It is assumed that the UE 90 has a configuration similar to that of the communication terminal 70 illustrated in FIG. 4.

First, the UE 90 transmits a Registration Request message to an AMF 31 (S31). The Registration Request includes information about a preferential network slice being a network slice accessed by the UE 90 immediately after completion of the Registration processing. The preferential network slice may be referred to as a network slice having a high degree of urgency. The preferential network slice may be one, or may be two or more. For example, when a plurality of S-NSSAIs are included in Requested NSSAI, the Requested NSSAI may include S-NSSAI indicating a preferential network slice and S-NSSAI indicating a network slice that is not a preferential network slice. Immediately after completion of the Registration processing may be, for example, timing before a lapse of a predetermined period after completion of the Registration processing.

Steps S32 to S37 are similar to steps S22 to S27 in FIG. 5, and thus detailed description thereof will be omitted.

Next, the AMF 31 performs secondary authentication in relation to a network slice that satisfies a predetermined requirement, and does not perform the secondary authentication in relation to a network slice that does not satisfy the predetermined requirement (S38).

For example, the AMF 31 performs the secondary authentication in step S38 in relation to a network slice that is a preferential network slice and is a network slice to which the secondary authentication is applied. In this case, the AMF 31 does not perform the secondary authentication in step S38 on a network slice that is not a preferential network slice and is a network slice to which the secondary authentication is applied. In other words, the AMF 31 does not perform the secondary authentication in the Registration processing on a network slice that is not a preferential network slice and is a network slice to which the secondary authentication is applied.

The secondary authentication for a network slice that is not a preferential network slice and is a network slice to which the secondary authentication is applied may be performed when the UE 90 accesses the network slice for the first time. In other words, the secondary authentication for a network slice that is not a preferential network slice and is a network slice to which the secondary authentication is applied may be performed when the UE 90 establishes a PDU Session with the network slice.

Further, as described in FIG. 5, when the UE 90 transmits UE capability together with information about the preferential network slice to the AMF 31, the AMF 31 may perform the secondary authentication according to the following requirement. For example, when the UE 90 can perform processing associated with the secondary authentication, the AMF 31 may perform the secondary authentication on a network slice that is a preferential network slice and to which the secondary authentication is applied. In other words, when the UE 90 cannot perform the processing associated with the secondary authentication, the AMF 31 may not perform the secondary authentication related to the UE 90 in a network slice that is a preferential network slice and to which the secondary authentication is applied.

As described above, the UE 90 according to the fourth example embodiment can transmit information indicating a preferential network slice to the AMF 31. In this way, the AMF 31 can perform only the secondary authentication on a preferential network slice without performing the secondary authentication related to all network slices determined to be network slices to which the secondary authentication is applied in step S37. As a result, as compared to a case where the AMF 31 performs the secondary authentication on all network slices, when the AMF 31 performs only the secondary authentication on a preferential network slice, time related to the secondary authentication can be reduced, and a processing load related to the secondary authentication processing can also be reduced.

Fifth Example Embodiment

Figure 7:
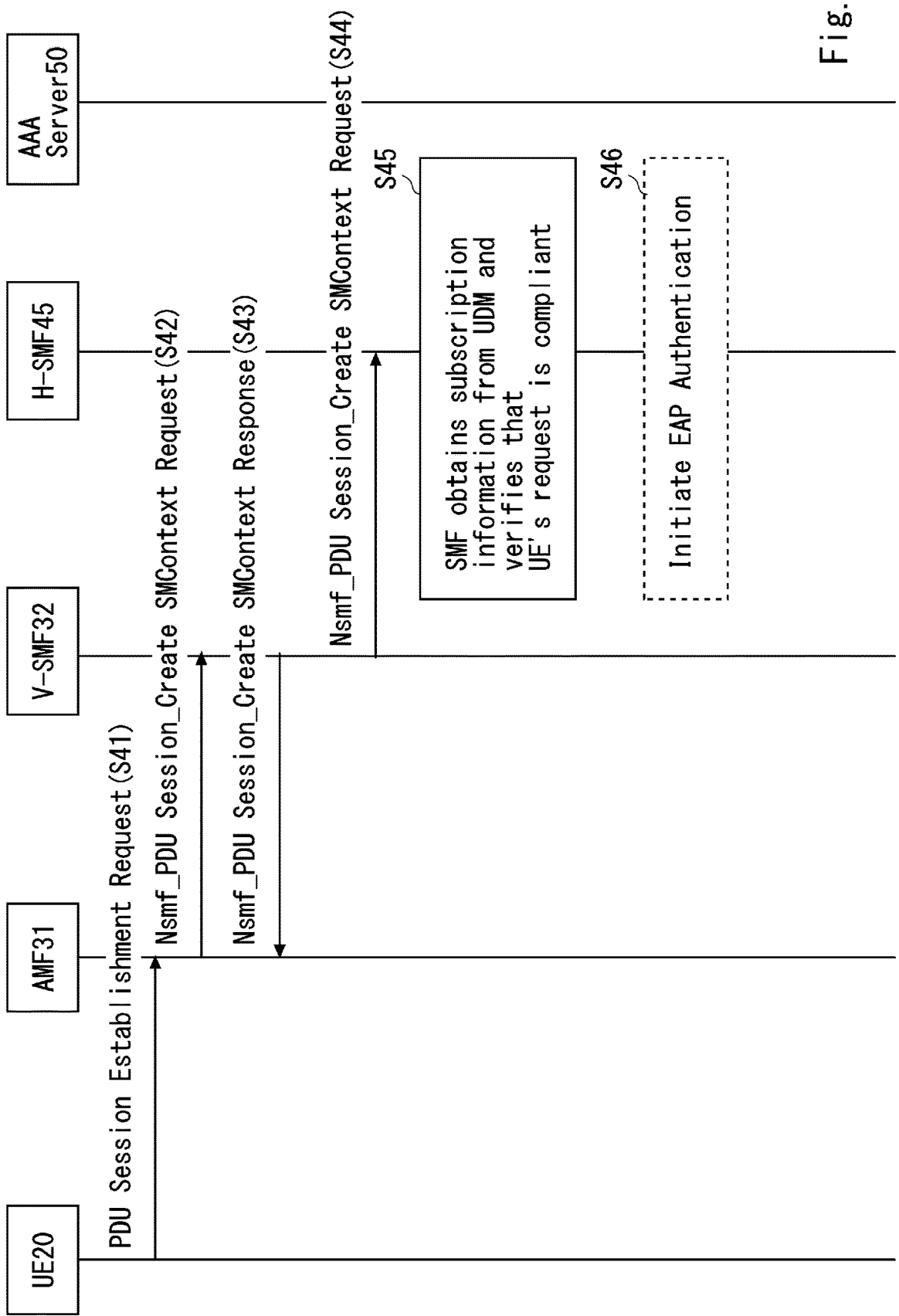
FIG. 7 is a diagram illustrating a flow of authentication processing during PDU Session establishment according to a fifth example embodiment.

Then, a flow of authentication processing during PDU Session establishment according to a fifth example embodiment will be described by using FIG. 7. In FIG. 7, the flow of the processing in the communication system described in FIG. 2 will be described. When secondary authentication processing in Registration processing and authentication processing during the PDU Session establishment are individually performed, the following problem occurs.

The authentication processing during the PDU Session establishment is activated by an SMF. At this time, when the SMF does not recognize that the secondary authentication processing of UE in a specific network slice is performed in the Registration processing, the SMF performs the secondary authentication processing of the UE in the specific network slice during the PDU Session establishment. Thus, a problem that the secondary authentication processing is performed in an overlapping manner during the Registration processing and the PDU Session establishment occurs.

Thus, in the fifth example embodiment, the AMF 31 notifies the V-SMF 32 or the H-SMF 45 of information related to a network slice on which secondary authentication is already performed. In this way, the secondary authentication processing being performed in an overlapping manner during the Registration processing and the PDU Session establishment is avoided.

First, the UE 20 transmits an NAS message including a PDU Session Establishment Request to the AMF 31 (S41). The PDU Session Establishment Request includes S-NSSAI indicating a network slice being a connection destination.

Next, the AMF 31 selects the V-SMF 32, and transmits an Nsmf_PDUSession_CreateSMContext Request to the V-SMF 32 (S42). An Nsmf_PDUSession_UpdateSMContext Request may be transmitted instead of the Nsmf_PDUSession_CreateSMContext Request.

The Nsmf_PDUSession_CreateSMContext Request includes a subscription permanent identifier (SUPI) of the UE 20, the S-NSSAI, and a flag indicating that the authentication processing of the UE 20 in a network slice indicated by the S-NSSAI is already performed. The S-NSSAI is S-NSSAI included in the message received in step S41. The AMF 31 includes the flag in the Nsmf_PDUSession_CreateSMContext Request, and thus notifies the V-SMF 32 that the secondary authentication of the UE 20 in a specific network slice is already performed.

Next, V-SMF 32 transmits, to the AMF 31, an Nsmf_PDUSession_CreateSMContext Response as a response to the Nsmf_PDUSession_CreateSMContext Request (S43).

Next, the V-SMF 32 transmits, to the H-SMF 45, the Nsmf_PDUSession_CreateSMContext Request received in step S42 (S44). The H-SMF 45 can determine, by receiving the Nsmf_PDUSession_CreateSMContext Request, whether the secondary authentication processing of the UE 20 in the network slice indicated by the S-NSSAI is already performed.

Next, the H-SMF 45 acquires, from the UDM 41, subscriber data corresponding to the SUPI included in the Nsmf_PDUSession_CreateSMContext Request (S45).

Next, when the flag is not included in the Nsmf_PDUSession_CreateSMContext Request, the H-SMF 45 initiates EAP Authentication in order to perform the secondary authentication processing related to the UE 20 (S46). On the other hand, when the flag is included in the Nsmf_PDUSession_CreateSMContext Request, the H-SMF 45 determines that the authentication processing related to the UE 20 is already performed, and does not initiate the EAP Authentication in step S46.

Then, a flow of authentication processing during the PDU Session establishment according to the fifth example embodiment, which is different from that in FIG. 7, will be described by using FIG. 8.

First, N4 Session Establishment is performed between the V-SMF 32 and the UPF 33 (S51). Next, the V-SMF 32 transmits an Authentication/Authorization Request to the AAA Server 51 via the UPF 33 (S52). Next, the AAA Server 51 transmits an Authentication/Authorization Response to the V-SMF 32 via the UPF 33 (S53). Next, the V-SMF 32 transmits, to the AMF 31, an Namf_Communication_N1N2Message Transfer including the Authentication message transmitted from the AAA Server 51 (S54).

Next, the AMF 31 transmits, to the V-SMF 32, a Response as a response to the Namf_Communication_N1N2Message Transfer (S55). The AMF 31 includes, in the Response, a flag indicating that the secondary authentication processing of the UE 20 in a network slice to which the UE 20 needs to be connected is already performed.

Next, the AMF 31 transmits, to the UE 20, an NAS SM Transport including the Authentication message (S56). Next, the UE 20 transmits, to the AMF 31, an NAS SM Transport including the Authentication message (S57). Next, the AMF 31 transmits, to the V-SMF 32, an Nsmf_PDUSession_UpdateSMContext including the Authentication message (S58). Next, the V-SMF 32 transmits a Response to the AMF 31 (S59).

Herein, when the V-SMF 32 has not received the flag indicating that the secondary authentication processing of the UE 20 is already performed in step S55, the V-SMF 32 transmits an Authentication/Authorization Request to the AAA Server 51 via the UPF 33 (S60). The Authentication/Authorization Request includes the Authentication message. After the AAA server 51 performs the authentication processing of the UE 20 in a specific network slice, the AAA Server 51 transmits an Authentication/Authorization Response to the V-SMF 32 via the UPF 33 (S61).

In step S55, when the V-SMF 32 has received the flag indicating that the secondary authentication processing of the UE 20 in the network slice to which the UE 20 needs to be connected is already performed, the processing after step S60 is not performed.

Figure 8:
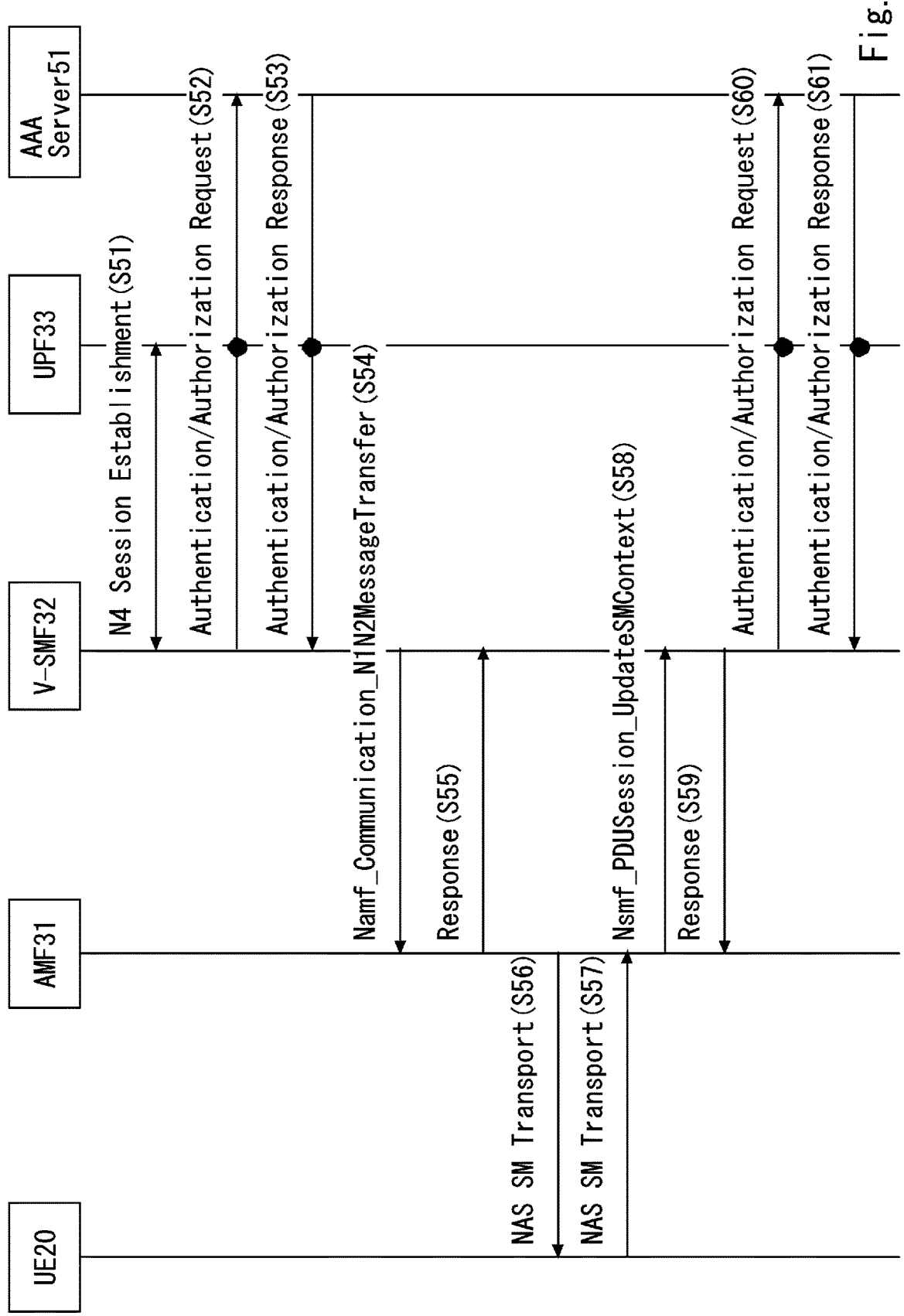
FIG. 8 is a diagram illustrating a flow of authentication processing during the PDU Session establishment according to the fifth example embodiment.

In FIG. 8, the processing of including the flag in the Response in step S55 is described, but the flag may be included in the Nsmf_PDUSession_UpdateSMContext in step S58. Alternatively, the AMF 31 may transmit the flag to the V-SMF 32 or the H-SMF 45 independently of the processing of the PDU Session establishment after the Registration processing is performed instead of during the PDU Session establishment. In this case, the V-SMF 32 or the H-SMF 45 may not perform and may omit the processing after S52.

As described above, the AMF 31 can notify the V-SMF 32 or the H-SMF 45 of the information related to the secondary authentication processing that is already performed. As a result, the secondary authentication processing being performed in an overlapping manner during the Registration processing and the PDU Session establishment can be avoided. In this way, time related to the secondary authentication can be reduced, and a processing load related to the secondary authentication processing can also be reduced.

Note that the present disclosure is not limited to the example embodiments described above, and may be appropriately modified without departing from the scope of the present disclosure.

Then, a configuration example of the core network device 10, the AMF 31, the SMF, the communication terminal 70, the UE 20, the UE 80, and the UE 90 described in the plurality of example embodiments described above will be described below.

Figure 9:
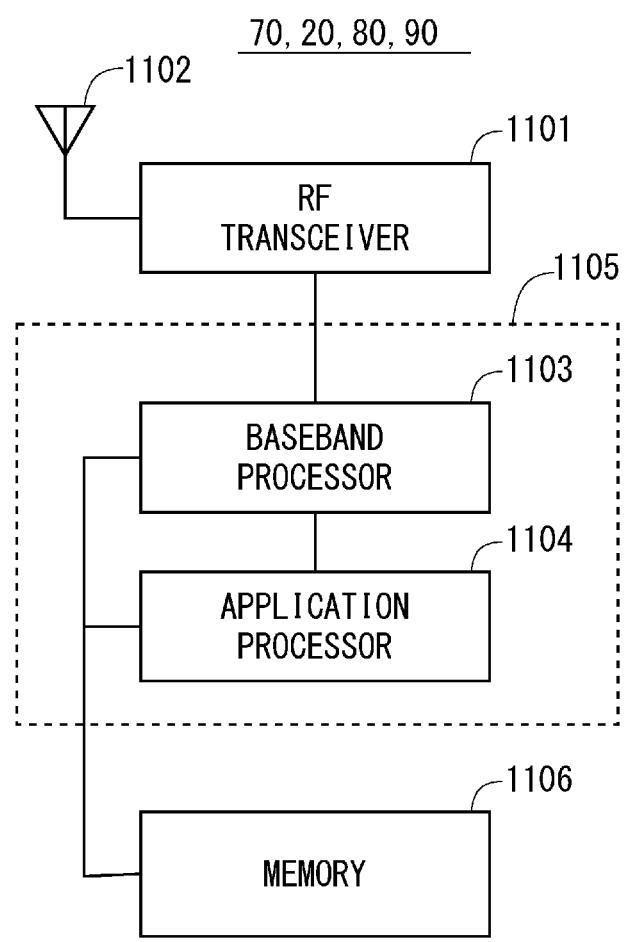
FIG. 9 is a diagram of the communication terminal and UE according to each of the example embodiments.

FIG. 9 is a block diagram illustrating the configuration example of the communication terminal 70, the UE 20, the UE 80, and the UE 90. A Radio Frequency (RF) transceiver 1101 performs analog RF signal processing for communicating with a base station. The analog RF signal processing performed by the RF transceiver 1101 includes a frequency up conversion, a frequency down conversion, and amplification. The RF transceiver 1101 is coupled to an antenna 1102 and a baseband processor 1103. In other words, the RF transceiver 1101 receives modulation symbol data (or OFDM symbol data) from the baseband processor 1103, generates a transmission RF signal, and supplies the transmission RF signal to the antenna 1102. Further, the RF transceiver 1101 generates a baseband reception signal, based on a reception RF signal received by the antenna 1102, and supplies the baseband reception signal to the baseband processor 1103.

The baseband processor 1103 performs digital baseband signal processing (data plane processing) and control plane processing for wireless communication. The digital baseband signal processing includes (a) data compression/decompression, (b) segmentation/concatenation of data, and (c) generation/disassembly of a transmission format (transmission frame). Furthermore, the digital baseband signal processing includes (d) transmission path encoding/decoding, (e) modulation (symbol mapping)/demodulation, (f) generation of OFDM symbol data (baseband OFDM signal) by inverse fast Fourier transform (IFFT), and the like. On the other hand, the control plane processing includes communication management of a layer 1 (e.g., transmission power control), a layer 2 (e.g., wireless resource management and hybrid automatic repeat request (HARQ) processing), and a layer 3 (e.g., attachment, mobility, and signaling related to call management).

For example, in a case of LTE and 5G, the digital baseband signal processing by the baseband processor 1103 may include signal processing of a packet data convergence protocol (PDCP) layer, a radio link control (RLC) layer, a MAC layer, and a PHY layer. Further, the control plane processing by the baseband processor 1103 may include processing of a non-access stratum (NAS) protocol, an RRC protocol, and MAC CE.

The baseband processor 1103 may include a modem processor (e.g., a digital signal processor (DSP)) that performs the digital baseband signal processing and a protocol stack processor (e.g., a central processing unit (CPU) or a micro processing unit (MPU)) that performs the control plane processing. In this case, the protocol stack processor that performs the control plane processing may be commonly used with an application processor 1104 described later.

The application processor 1104 is also referred to as a CPU, an MPU, a microprocessor, or a processor core. The application processor 1104 may include a plurality of processors (a plurality of processor cores). The application processor 1104 achieves various functions of the communication terminal 70, the UE 20, the UE 80, and the UE 90 by executing a system software program (operating system (OS)) being read from a memory 1106 or a memory that is not illustrated. Alternatively, the application processor 1104 achieves various functions of the communication terminal 70, the UE 20, the UE 80, and the UE 90 by executing various application programs being read from the memory 1106 or the memory that is not illustrated. The application program may be, for example, a call application, a Web browser, a mailer, a camera operation application, or a music reproduction application.

In some mounting, as indicated by a broken line (1105) in FIG. 9, the baseband processor 1103 and the application processor 1104 may be integrated on one chip. In other words, the baseband processor 1103 and the application processor 1104 may be mounted as one system on chip (SoC) device 1105. The SoC device may also be referred to as a system large scale integration (LSI) or a chip set.

The memory 1106 is a volatile memory, a non-volatile memory, or a combination of the volatile memory and the non-volatile memory. The memory 1106 may include a plurality of memory devices being physically independent. The volatile memory is, for example, a static random access memory (SRAM), a dynamic RAM (DRAM), or a combination of the SRAM and the DRAM. The non-volatile memory is a mask read only memory (MROM), an electrically erasable programmable ROM (EEPROM), a flash memory, a hard disk drive, or any combination of the MROM, the EEPROM, the flash memory, and the hard disk drive. For example, the memory 1106 may include an external memory device that can be accessed from the baseband processor 1103, the application processor 1104, and the SoC 1105. The memory 1106 may include a built-in memory device integrated in the baseband processor 1103, the application processor 1104, or the SoC 1105. Furthermore, the memory 1106 may include a memory in a universal integrated circuit card (UICC).

The memory 1106 may store a software module (computer program) including a command group and data for performing processing by the communication terminal 70, the UE 20, the UE 80, and the UE 90 described in the plurality of example embodiments described above. In some mounting, the baseband processor 1103 or the application processor 1104 may be configured to perform the processing described in the example embodiment described above by reading the software module from the memory 1106 and executing the software module.

Figure 10:
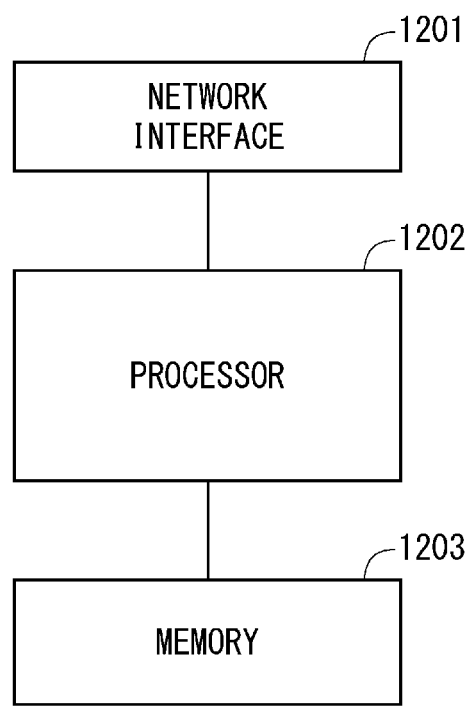
FIG. 10 is a configuration diagram of the core network device and an AMF according to each of the example embodiments.

FIG. 10 is a block diagram illustrating a configuration example of the control device 10, the AMF 31, and the SMF. With reference to FIG. 10, the core network device 10, the AMF 31, and the SMF include a network interface 1201, a processor 1202, and a memory 1203. The network interface 1201 is used for communicating with another network node device constituting a communication system. The network interface 1201 may include, for example, a network interface card (NIC) conforming to IEEE 802.3 series.

The processor 1202 performs the processing of the core network device 10, the AMF 31, and the SMF described by using the sequence diagrams and the flowcharts in the example embodiments described above by reading software (computer program) from the memory 1203 and executing the software. The processor 1202 may be, for example, a microprocessor, a micro processing unit (MPU), or a central processing unit (CPU). The processor 1202 may include a plurality of processors.

The memory 1203 is constituted by a combination of a volatile memory and a non-volatile memory. The memory 1203 may include a storage disposed away from the processor 1202. In this case, the processor 1202 may access the memory 1203 via an I/O interface that is not illustrated.

In the example of FIG. 10, the memory 1203 is used for storing a software module group. The processor 1202 can perform the processing of the core network device 10, the AMF 31, and the SMF described in the example embodiments described above by reading the software module group from the memory 1203 and executing the software module group.

As described by using FIG. 10, each processor included in the core network device 10, the AMF 31, and the SMF executes one or a plurality of programs including a command group for causing a computer to perform an algorithm described by using the drawings.

In the example described above, a program is stored by using a non-transitory computer readable medium of various types, and can be supplied to a computer. The non-transitory computer readable medium includes a tangible storage medium of various types. Examples of the non-transitory computer readable medium include a magnetic recording medium, or an optical magnetic recording medium (for example, an optical magnetic disk), a CD-ROM (read only memory), a CD-R, a CD-R/W, and a semiconductor memory. The magnetic recording medium may be, for example, a flexible disk, a magnetic tape, and a hard disk drive. A semiconductor memory may be, for example, a mask ROM, a programmable ROM (PROM), an erasable PROM (EPROM), a flash ROM, and a random access memory (RAM). Further, a program may be supplied to a computer by a transitory computer readable medium of various types. Examples of the transitory computer readable medium include an electric signal, an optical signal, and an electromagnetic wave. The transitory computer readable medium can supply a program to a computer via a wired communication path such as an electric wire and an optical fiber or a wireless communication path.

User equipment (UE) (or including a mobile station, a mobile terminal, a mobile device, a wireless device, or the like) in the present specification is an entity connected to a network via a wireless interface.

The UE in the present specification is not limited to a dedicated communication device, and may be any equipment as follows including a communication function as the UE described in the present specification.

Each of "user equipment (UE) (as a word used in the 3GPP)", a "mobile station", a "mobile terminal", a "mobile device", and a "wireless terminal" as a term is intended to generally synonymous with each other, and may be a standalone mobile station such as a terminal, a cellular phone, a smartphone, a tablet, a cellular IoT terminal, and an IoT device.

Note that it can be understood that the "UE" and the "wireless terminal" as a term also include a device that is stationary for a long period.

Further, the UE may be, for example, production facilities, manufacturing facilities and/or an energy-related machine (as one example, a boiler, an engine, a turbine, a solar panel, a wind power generator, a hydroelectric generator, a thermal power generator, an atomic power generator, a storage battery, an atomic power system, atomic power-related equipment, heavy electric equipment, a pump including a vacuum pump and the like, a compressor, a fan, an air blower, hydraulic equipment, air pressure equipment, a metalworking machine, a manipulator, a robot, a robot application system, a tool, a die, a roll, a conveyance device, a raising and lowering device, a freight device, a textile machine, a sewing machine, a printer, a printing-related machine, a paper machine, a chemical machine, a mining machine, a mining-related machine, a construction machine, a construction-related machine, an agricultural machine and/or appliance, a forestry machine and/or appliance, a fishery machine and/or appliance, a safety and/or environmental preservation appliance, a tractor, a bearing, a precision bearing, a chain, a gear, a power transmission device, a lubricating device, a valve, a pipe fitting, and/or an application system of any equipment or machine described above).

Further, the UE may be, for example, a transportation device (as one example, a vehicle, a car, a two-wheeled vehicle, a bicycle, a train, a bus, a bicycle cart, a rickshaw, ship and other watercraft, an airplane, a rocket, a satellite, a drone, a balloon, and the like).

Further, the UE may be, for example, an information communication device (as one example, an electronic computer and a related device, a communication device and a related device, an electronic component, and the like).

Further, the UE may be, for example, a freezer, freezer application product and device, commercial and service equipment, a vending machine, an automatic service machine, office machine and device, consumer electrical and electronic machine appliances (as one example, voice equipment, a speaker, a radio, video equipment, a television, a multifunctional microwave open, a rice cooker, a coffee maker, a dishwasher, a drier, a fan, a ventilation fan, and a related product, a vacuum cleaner, and the like).

Further, the UE may be, for example, an electronic application system or an electronic application device (as one example, an X-ray device, a particle acceleration device, a radioactive substance application device, a sound wave application device, an electromagnetic application device, a power application device, and the like).

Further, the UE may be, for example, an electric bulb, lighting, a weighing machine, analysis equipment, a testing machine, and a measurement machine (as one example, a smoke alarm, a human alarm sensor, a motion sensor, a wireless tag, and the like), a watch or a clock, a physical and chemical machine, an optical machine, medical equipment and/or a medical system, a weapon, cutlery, a hand tool, or the like.

Further, the UE may be, for example, a personal digital assistant or a device including a wireless communication function (as one example, an electronic device (for example, a personal computer, an electronic measuring instrument, and the like) to which a wireless card, a wireless module, and the like are attached or inserted).

Further, the UE may be, for example, a device that provides the following application, service, and solution or a part of the device in "Internet of Things (IoT)" using wired and wireless communication techniques.

An IoT device (or thing) includes appropriate electronic equipment, software, sensor, network connection, and the like that enable data collection and data exchange between devices and with another communication device.

Further, the IoT device may be automated equipment that follows a software instruction stored in an internal memory.

Further, the IoT device may operate without a need to be supervised or handled by human.

Further, the IoT device may be a device equipped over a long period and/or remain in an inactive state over a long period.

Further, the IoT device may be mounted as a part of a stationary device. The IoT device may be embedded in a non-stationary device (for example, a vehicle and the like), or may be attached to an animal and a person to be monitored/tracked.

It can be understood that an IoT technique can be mounted on any communication device that can be connected to a communication network that transmits and receives data regardless of control by input of human or a software command stored in a memory.

It can be understood that the IoT device may be referred to as a machine type communication (MTC) device, a machine to machine (M2M) communication device, or narrow band-IoT (NB-IoT) UE.

Further, it can be understood that the UE can support one or a plurality of IoT or MTC applications.

A few examples of the MTC application are listed in the following table (source: 3GPP TS22.368 V13.2.0 (2017-01-13) Annex B, content thereof is incorporated in the present specification as a reference). The list is not comprehensive, and indicates an MTC application as one example.

| SERVICE RANGE | MTC APPLICATION |
| --- | --- |
| SECURITY | MONITORING SYSTEM |
|  | BACKUP OF FIXED-LINE TELEPHONE |
|  | CONTROL OF PHYSICAL ACCESS (FOR EXAMPLE, ACCESS TO BUILDING, AND THE LIKE) |
|  | SECURITY OF CAR/DRIVER |
| TRACKING & TRACING | FLEET MANAGEMENT |
|  | ORDER MANAGEMENT |
|  | TELEMATICS INSURANCE: PAY AS YOU DRIVE (PAYD) |
|  | ASSET MANAGEMENT |
|  | NAVIGATION |
|  | TRAFFIC INFORMATION |
|  | ROAD TOLLING |
|  | ROAD TRAFFIC OPTIMIZATION/STEERING |
| PAYMENT | POINT OF SALES (POS) |
|  | VENDING MACHINES |
|  | GAMING MACHINES |
| HEALTH | MONITORING VITAL SIGNS |
|  | SUPPORTING THE AGED OR HANDICAPPED |
|  | WEB ACCESS TELEMEDICINE POINTS |
|  | REMOTE DIAGNOSTICS |
| REMOTE MAINTENANCE/ CONTROL | SENSOR |
|  | LIGHTING |
|  | PUMPS |
|  | VALVES |
|  | ELEVATOR CONTROL |
|  | VENDING MACHINE CONTROL |
|  | VEHICLE DIAGNOSTICS |
| METERING | POWER |
|  | GAS |
|  | WATER |
|  | HEATING |
|  | GRID CONTROL |
|  | INDUSTRIAL METERING |
| CONSUMER DEVICES | DIGITAL PHOTO FRAME |
|  | DIGITAL CAMERA |
|  | ELECTRONIC BOOK |

The application, the service, and the solution may be, as one example, mobile virtual network operator (MVNO) service/system, disaster prevention wireless service/system, private wireless telephone (private branch exchange (PBX)) service/system, PHS/digital cordless telephone service/system, a point of sale (POS) system, advertisement transmission service/system, multicasting (multimedia broadcast and multicast service (MBMS)) service/system, vehicle to everything (V2X: vehicle-to-vehicle communication and road-to-vehicle and pedestrian-to-vehicle communication) service/system, train mobile wireless service/system, positional information-related service/system, disaster/emergency wireless community service/system, Internet of Things (IoT) service/system, communication service/system, video distribution service/system, Femto cell application service/system, voice over LTE (VoLTE) service/system, wireless TAG service/system, charging service/system, radio on demand service/system, roaming service/system, user behavior monitoring service/system, communication carrier/communication NW selection service/system, function limiting service/system, proof of concept (PoC) service/system, terminal-specific personal information management service/system, terminal-specific display and video service/system, terminal-specific non-communication service/system, ad hoc NW/delay tolerant networking (DTN) service/system, and the like.

Note that the categories of the UE described above are merely application examples of the technical thought and the example embodiments described in the present specification. The present disclosure is not limited to the examples, and, of course, various modifications can be made by those skilled in the art.

Although the invention of the present application has been described with reference to the example embodiments, the invention of the present application is not limited to the above-described example embodiments. Various modifications that can be understood by those skilled in the art can be made to the configuration and the details of the invention of the present application within the scope of the invention.

This application is based upon and claims the benefit of priority from Japanese patent application No. 2018-185420, filed on Sep. 28, 2018, the disclosure of which is incorporated herein in its entirety by reference.

A part or the whole of the above-described example embodiments may also be described as in supplementary notes below, which is not limited thereto.

(Supplementary Note 1)

A core network device including:
- a first authentication means for performing, during registration processing of registering a communication terminal in a core network, first authentication processing of determining whether the communication terminal is a communication terminal permitted to be registered in the core network;
- a communication means for receiving permission list information indicating at least one network slice usable by the communication terminal in a serving network; and
- a second authentication means for performing, during registration processing of registering the communication terminal in the core network, second authentication processing of determining whether the communication terminal is a communication terminal permitted to use a network slice included in the permission list information.

(Supplementary Note 2)

The core network device according to Supplementary Note 1, wherein, when a plurality of the network slices are included in the permission list information, the second authentication means is configured to determine whether the second authentication processing is required to be performed in each of the network slices, and to perform the second authentication processing for each of the network slices that require the second authentication processing to be performed.

(Supplementary Note 3)

The core network device according to Supplementary Note 1 or 2, wherein the communication means is configured to transmit, to an authentication server associated with the network slice, identification information about the communication terminal being used when the communication terminal uses the network slice.

(Supplementary Note 4)

The core network device according to Supplementary Note 3, wherein the communication means is configured to acquire identification information about the communication terminal from the communication terminal for each of the network slices included in the permission list information.

(Supplementary Note 5)

The core network device according to any one of Supplementary Notes 1 to 4, wherein, when the second authentication means is configured to perform the second authentication processing during registration processing in which the communication terminal registers the communication terminal in the core network via a first access network, the second authentication means is configured to omit the second authentication processing during registration processing in which the communication terminal registers the communication terminal in the core network via a second access network.

(Supplementary Note 6)

The core network device according to any one of Supplementary Notes 1 to 5, wherein, when the second authentication means is configured to determine that the communication terminal is not a communication terminal permitted to use a network slice included in the permission list information, the second authentication means is configured to notify the communication terminal of identification information about a predetermined network slice.

(Supplementary Note 7)

A core network device including:
  a communication means for receiving, from a communication terminal, a Registration Request message including information indicating whether the communication terminal supports Slice-Specific Authentication and Authorization, during registration processing of registering the communication terminal in a core network; and
  an authentication means for performing, when the information indicates that the communication terminal supports Slice-Specific Authentication and Authorization, processing related to the Slice-Specific Authentication and Authorization.

(Supplementary Note 8)

The core network device according to Supplementary Note 7, wherein the authentication means is configured not to perform, when the information indicates that the communication terminal does not support Slice-Specific Authentication and Authorization, processing related to the Slice-Specific Authentication and Authorization.

(Supplementary Note 9)

The core network device according to Supplementary Note 7 or 8, wherein, when the authentication means is configured not to perform the processing related to the Slice-Specific Authentication and Authorization, the communication means is configured to transmit, to the communication terminal, a Registration Reject message including a specific cause code in response to the Registration Request message.

(Supplementary Note 10)

A communication terminal including
  a communication means for transmitting, to a core network device, a Registration Request message including information indicating whether a communication terminal supports Slice-Specific Authentication and Authorization.

(Supplementary Note 11)

The communication terminal according to Supplementary Note 10, wherein, if the communication terminal does not support the Slice-Specific Authentication and Authorization, a core network device that receives the Registration Request message does not perform processing related to the Slice-Specific Authentication and Authorization.

(Supplementary Note 12)

The communication terminal according to Supplementary Note 10 or 11, wherein, if the core network device is configured not to perform processing related to the Slice-Specific Authentication and Authorization, the communication means is configured to receive, from the core network device, a Registration Reject message including a specific cause code in response to the Registration Request message.

(Supplementary Note 13)

A core network device including:
  a first authentication means for performing, during registration processing of registering a communication terminal in a core network, first authentication processing of determining whether the communication terminal is a communication terminal permitted to be registered in the core network;
  a communication means for receiving, from the communication terminal, information related to a plurality of network slices desired to be used, and information related to a network slice being preferentially used among the plurality of network slices; and
  a second authentication means for performing, during registration processing of registering the communication terminal in the core network, second authentication processing of determining whether the communication terminal is a communication terminal permitted to use the network slice being preferentially used.

(Supplementary Note 14)

The core network device according to Supplementary Note 13, wherein the second authentication means is configured to perform the second authentication processing when the communication terminal uses for a first time the network slice on which the second authentication processing is not performed after the registration processing is completed.

(Supplementary Note 15)

A communication terminal including
  a communication means for transmitting, to a core network device, information related to a plurality of network slices desired to be used, and information related to a network slice being preferentially used among the plurality of network slices, during registration processing of registering a communication terminal in a core network.

(Supplementary Note 16)

The communication terminal according to Supplementary Note 15, wherein the communication means is configured to include, in a Registration Request message, information related to the network slice being preferentially used and information related to a network slice different from the network slice being preferentially used, and transmits the Registration Request message.

(Supplementary Note 17)
A communication system, including:
a first core network device configured to perform, during registration processing of registering a communication terminal in a core network, first authentication processing of determining whether the communication terminal is a communication terminal permitted to be registered in the core network, to perform, during registration processing of registering the communication terminal in the core network, second authentication processing of determining whether the communication terminal is a communication terminal permitted to use a network slice, and to transmit information indicating a network slice on which the second authentication processing is performed; and
a second core network device configured to receive information indicating a network slice on which the second authentication processing is performed, to determine whether the second authentication processing related to the communication terminal is performed when the communication terminal uses the network slice for a first time after the registration processing is completed, to perform the second authentication processing when the second authentication processing is not performed, and not to perform the second authentication processing when the second authentication processing is already performed.

(Supplementary Note 18)
The communication system according to Supplementary Note 17, wherein the first core network device transmits, during PDU Session establishment processing, information indicating a network slice on which the second authentication processing is performed.

(Supplementary Note 19)
An authentication method in a core network device, the authentication method including:
performing, during registration processing of registering a communication terminal in a core network, first authentication processing of determining whether the communication terminal is a communication terminal permitted to be registered in the core network;
receiving permission list information indicating at least one network slice usable by the communication terminal in a serving network; and
performing, during registration processing of registering the communication terminal in the core network, second authentication processing of determining whether the communication terminal is a communication terminal permitted to use a network slice included in the permission list information.

(Supplementary Note 20)
A communication method in a communication terminal, the communication method including:
generating, during registration processing of registering a communication terminal in a core network, capability information indicating whether processing associated with second authentication processing of determining whether the communication terminal is a communication terminal permitted to use a network slice can be performed; and
transmitting the capability information to a core network device.

REFERENCE SIGNS LIST

10 Core network device
11 Authentication unit
12 Authentication unit
13 Communication unit
20 UE
30 Serving PLMN
31 AMF
32 V-SMF
33 UPF
40 HPLMN
41 UDM
42 AUSF
43 NSSF
44 NEF
45 H-SMF
46 UPF
50 3rd party network
51 AAA Server
60 Network slice
70 Communication terminal
71 Control unit
72 Communication unit
80 UE
90 UE

What is claimed is:

1. A communication apparatus comprising:
at least one memory storing instructions; and
at least one processor configured to execute the instructions:
  to receive, from a communication terminal, a Registration Request message including Requested Network Slice Selection Assistance Information (Requested NSSAI) and capability information of the communication terminal, the capability information of the communication terminal indicating whether the communication terminal is capable of performing Slice-Specific Authentication and Authorization,
  to perform a procedure related to the Slice-Specific Authentication and Authorization if the capability information indicates that the communication terminal is capable of performing the Slice-Specific Authentication and Authorization, and
  not to perform the procedure related to the Slice-Specific Authentication and Authorization if the capability information indicates that the communication terminal is not capable of performing the Slice-Specific Authentication and Authorization.

2. The communication apparatus according to claim 1, wherein the at least one processor is further configured to execute the instructions to:
  transmit, to the communication terminal, a response message including a specific cause value related to the Slice-Specific Authentication and Authorization in response to the Registration Request message if the capability information indicates that the communication terminal is not capable of performing the Slice-Specific Authentication and Authorization and if the Requested NSSAI includes one or more Single Network Slice Selection Assistance Information (S-NSSAIs), which map to one or more S-NSSAIs subject to the Slice-Specific Authentication and Authorization.

3. The communication apparatus according to claim 2, wherein the one or more S-NSSAIs subject to the Slice-Specific Authentication and Authorization are obtained a Unified Data Management (UDM), using Nudm_SDM_Get.

4. The communication apparatus according to claim 1, wherein the communication apparatus is an Access Management Function (AMF).

5. A communication terminal comprising:

at least one memory storing instructions; and at least one processor configured to execute the instructions to:

transmit, to a communication apparatus, a Registration Request message including Requested Network Slice Selection Assistance Information (Requested NSSAI) and capability information of the communication terminal, the capability information of the communication terminal indicating whether the communication terminal is capable of performing Slice-Specific Authentication and Authorization.

6. The communication terminal according to claim 5, wherein the at least one processor is further configured to execute the instructions to:

receive, from the communication apparatus, a response message including a specific cause value related to the Slice-Specific Authentication and Authorization in response to the Registration Request message if the capability information indicates that communication terminal is not capable of performing the Slice-Specific Authentication and Authorization and if the Requested NSSAI includes one or more Single Network Slice Selection Assistance Information (S-NSSAIs) which map to one or more S-NSSAIs subject to the Slice-Specific Authentication and Authorization.

7. The communication terminal according to claim 5, wherein the communication apparatus is an Access Management Function (AMF).

8. A method of a communication apparatus, the method comprising:

receiving, from a communication terminal, a Registration Request message including Requested Network Slice Selection Assistance Information (Requested NSSAI) and capability information of the communication terminal, the capability information of the communication terminal indicating whether the communication terminal is capable of performing Slice-Specific Authentication and Authorization;

performing a procedure related to the Slice-Specific Authentication and Authorization if the capability information indicates that the communication terminal is capable of performing the Slice-Specific Authentication and Authorization; and not performing the procedure related to the Slice-Specific Authentication and Authorization if the capability information indicates that the communication terminal is not capable of performing the Slice-Specific Authentication and Authorization.

9. The method according to claim 8, further comprising:

transmitting, to the communication terminal, a response message including a specific cause value related to the Slice-Specific Authentication and Authorization in response to the Registration Request message if the capability information indicates that the communication terminal is not capable of performing the Slice-Specific Authentication and Authorization and if the Requested NSSAI includes one or more Single Network Slice Selection Assistance Information (S-NSSAIs) which map to one or more S-NSSAIs subject to the Slice-Specific Authentication and Authorization.

10. The method according to claim 9, wherein the one or more S-NSSAIs subject to the Slice-Specific Authentication and Authorization are obtained from a Unified Data Management (UDM), using Nudm_SDM_Get.

11. The method according to claim 8, wherein the communication apparatus is an Access Management Function (AMF).

12. A method of a communication terminal, the method comprising:

communicating with a communication apparatus; and transmitting a Registration Request message including Requested Network Slice Selection Assistance Information (Requested NSSAI) and capability information of the communication terminal, the capability information of the communication terminal indicating whether the communication terminal is capable of performing Slice-Specific Authentication and Authorization.

13. The method according to claim 12, further comprising:

receiving a response message including a specific cause value related to the Slice-Specific Authentication and Authorization in response to the Registration Request message if the capability information indicates that communication terminal is not capable of performing the Slice-Specific Authentication and Authorization and if the Requested NSSAI includes one or more Single Network Slice Selection Assistance Information (S-NSSAIs) which map to one or more S-NSSAIs subject to the Slice-Specific Authentication and Authorization.

14. The method according to claim 12, wherein the communication apparatus is an Access Management Function (AMF).

* * * * *